Figure 2:
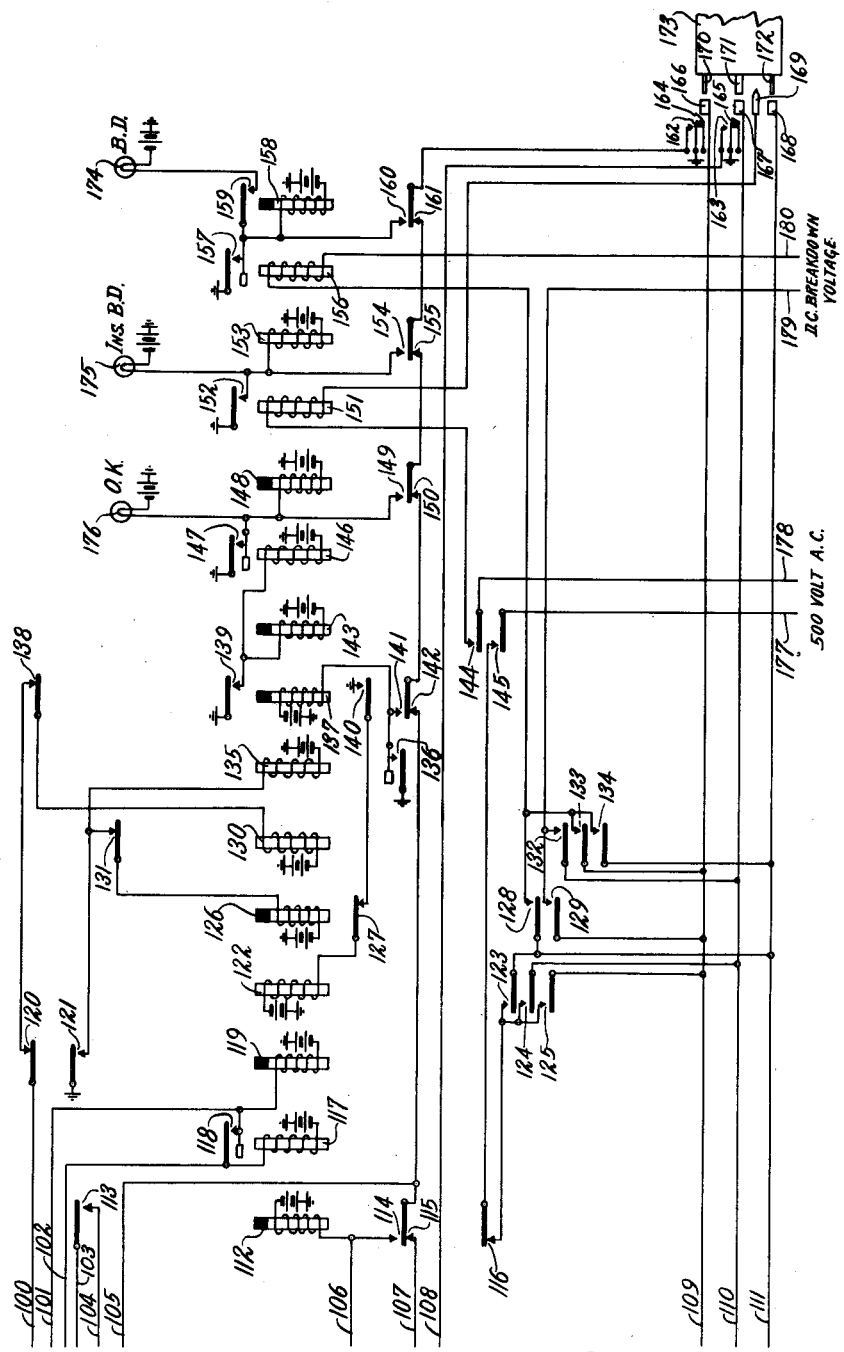

April 12, 1932.                H. C. ROBINSON                    1,853,639
                                TESTING EQUIPMENT
                               Filed Dec. 31, 1929              2 Sheets-Sheet 1

Inventor
Harold C. Robinson

April 12, 1932.   H. C. ROBINSON   1,853,639
TESTING EQUIPMENT
Filed Dec. 31, 1929   2 Sheets-Sheet 2

Inventor
Harold C. Robinson

Patented Apr. 12, 1932

1,853,639

UNITED STATES PATENT OFFICE

HAROLD C. ROBINSON, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

TESTING EQUIPMENT

Application filed December 31, 1929. Serial No. 417,814.

The present invention relates in general to testing equipment but is more particularly concerned with the testing equipment for performing the various capacity and breakdown tests on electric condensers. The main object of the invention is the provision of a test set for automatically testing both two and three-plate telephone condensers.

According to one feature of the invention, all that is required of the operator is to place the condensers in position and the set will automatically make the various tests and indicate the results by means of indicating lamps.

Another feature of the invention lies in the provision of a plurality of positions with means for automatically starting the test at the succeeding position as soon as the first test has progressed far enough to release the common equipment. Thus the set is always in operation as long as there are any condensers in position and the speed of testing and the number of condensers which can be tested by each operator is thereby greatly increased.

According to another feature of the invention, either two-plate or three-plate condensers may be tested without any special precautions or operations on the part of the operator.

Another feature of the invention lies in the provision of means for automatically stopping the test of one condenser as soon as a defect is found, for indicating in what respect the condenser has failed, and for immediately starting the test of the succeeding condenser.

Other features of the invention and a complete understanding of the operation thereof may be had from the following detailed specification when read in connection with the accompanying drawings comprising Figs. 1 and 2.

The drawings, with Fig. 2 placed to the right of Fig. 1, show, by means of the usual circuit diagram, a condenser test set according to the present invention.

The portion of the drawings to the right of the dotted vertical line at the left of Fig. 1 shows a relay group such as is provided at each position of the set. The start relays 2 and 3 of positions 2 and 3, corresponding to relay 1 of position 1, have been shown to illustrate the chain circuit for each relay whereby only one start relay can operate at a time as will be explained in detail later. The harmonic converter H and the high-low relay structure G shown in the lower left-hand portion of Fig. 1 are common to the several positions of the set. The harmonic converter H is of the well-known type in the art of telephony and its detailed structure and operation is shown in Patent #1,181,656, issued May 2, 1916, to C. J. Erickson. The operation of the high-low relay G will be explained in detail later.

The jack by means of which connections are made to the condenser under test is shown at the extreme right of Fig. 2. When a condenser is inserted in position, the terminals of the condenser come in contact with the jack contacts 166, 167, and 168 and force these contacts to the left thereby operating the jack springs 164 and 165 and closing contacts 162 and 163. The sharp contact 169 penetrates the paint or enamel covering the condenser can and makes electrical contact with the can. In the upper portion of the figures are shown the lamps 93 to 96, inclusive, 174, and 175 which are lighted to inform the operator of any defect in the condenser being tested, and the lamp 176 which is lighted to inform the operator that the condenser has successfully passed all the tests.

The operation of the test set when testing three-plate condensers will first be described. When the operator of the test set inserts the condenser 173 indicated in the lower right-hand corner of Fig. 2, in position 1 of the set, the three terminals of the condenser, 172, 171, and 170, are brought into contact with the terminals 168, 167, and 166, respectively, of the test set. At the same time the sharp-pointed contact 169 makes electrical contact with the can of the condenser. Contacts 166 to 168, inclusive, are normally held in the position shown by means of springs. When the condenser is inserted in position, these springs are compressed and these contacts are moved to the left. Contacts 166 and 167 in moving to the left strike the operating springs 164 and 165, respectively, and thereby close the start contact 162 and the three-plate contact 163.

The closing of the three-plate contact 163 completes an obvious circuit for relays 74 and 18 in multiple. These two relays remain operated as long as the three-plate condenser is in position and their functions will be explained later. The closing of the start contact 162 completes the following circuit: ground, contact 162, back contacts 161, 155, 150, 142, 115, conductor 107, back contacts 57 and 52 winding of relay 1, back contact 9 of relay 2, and back contact 11 of relay 3 to battery. It should be explained at this time that the test set illustrated in the drawings comprises three positions. Position 1 of the set is shown in detail but only the start relays 2 and 3 of positions 2 and 3 have been shown. These relays correspond to relay 1 of position 1. It will be seen from an inspection of the circuit arrangement of these three relays that the circuit of the start relay of each position passes through contacts of the start relays of the other two positions. Thus if any one of the positions is testing and the start relay is operated, neither of the other two positions can start their test.

In the present case it will be assumed that neither the second nor third positions are testing and the contacts 9 and 11 are therefore closed. Accordingly, relay 1 operates in the above-traced circuit and at contact 4 opens the battery circuit for the start relay 2 at position 2, and at contact 5 opens the battery circuit for the start relay 3 at position 3. At contacts 6 and 7, circuits are prepared which are used in the capacity test of the condenser. Relay 13 operates in multiple with relay 1 over back contact 32 of relay 30. At contact 14, relay 13 completes a circuit for relay 15. The make contact of relay 13 is a weighted spring contact and some time is required for this spring to come to rest and allow the circuit for relay 15 to remain closed. Relay 15 is made slow-to-operate so that it will not operate until the weighted spring of relay 13 comes to rest. Relay 1 in operating also closes at contact 10 a circuit extending from ground, contact 10, front contact 21, back contact 37, winding of relay 43 to battery. Relay 43 operates in this circuit and closes its front contacts 44 and 46 thereby initiating the capacity test of the condenser.

It might be advisable, at this time, to explain the operation and functions of the harmonic converter H and the high-low relay G. The harmonic converter H is of the type described in the patent already referred to, and a detailed description of its structure and operation is not thought necessary. With the vibrating arm 89 in the position shown in the drawings, an obvious circuit is closed for the magnet 88 of the converter. The energization of the magnet causes the arm 89 to swing to the left thereby closing the contact 86 and at the same time opening contact 90 in the magnet circuit. The closing of contact 86 places ground through resistance 87 on the common lead 92 for charging the condenser. When the magnet deenergizes, due to the opening of contact 90, the arm 89 swings to the right opening contact 86 and closing contact 85. At the same time contact 90 is again closed and the cycle of operations is again repeated. The closing of contact 85 transfers the common lead 92 to the coil 84 of the high-low relay. The condenser is then discharged through this relay coil as will be explained in detail later.

The operation of the high-low relay G is similar to that of the well-known milli-ammeter movement. The relay consists of the coil 84 which is suspended in a magnetic field and pivoted at point 181. The coil has been shown separate from the remainder of the movement for the sake of clearness. Attached to the coil is a horizontal beam 182 also pivoted at 181 and having a pointer at each end. These pointers are directly above two mercury cups 82 and 83. The cups are adjustable so that the range through which the beam can rotate may be increased or decreased by varying the position of the cups. With no current flowing in coil 84, the right arm of the beam is in contact with the mercury in cup 83. When a condenser under test is discharged through coil 84, the coil and beam rotate about the point 181 due to the magnetic action between the field in which the coil is suspended and the field set up by the current in the coil. The amount of rotation is directly proportional to the value of the current flowing in the coil and is therefore proportional to the capacity of the condenser which is discharging through the coil. The coil 84 is shunted with a variable resistance 99 so that condensers of various capacities may be tested. If the capacity of the condenser under test is higher than the allowable range for which the relay is adjusted, the coil will rotate through a sufficient angle to allow the pointer on the left arm of the beam to make contact with the mercury in cup 82. On the other hand, if the capacity of the condenser is below the allowable range, the coil will not rotate far enough to lift the right arm of the beam out of the mercury in cup 83. If the capacity of the condenser is within the required limits the coil and beam will rotate through an angle which will break the contact at 83 but will not make the contact at 82.

When relay 43 operated and closed its contacts 44 and 46 as described above, a circuit was closed from battery, rheostat 97, common conductor 91, contact 44, conductor 111, contact 168, terminal 172 of the condenser, terminal 171, contact 167, conductor 110, contact 46, to the common conductor 92. When the harmonic converter operates to close its contact 86, the condenser is charged in the above-traced circuit. When the harmonic converter operates in the opposite direction, contact 85 closes and transfers the common conductor 92 to the coil 84 of the high-low relay, and the condenser is discharged through this coil. The rheostat 97 and the shunt resistance 99 are provided so that condensers of different capacities may be tested. The operation of the high-low relay now depends upon whether the actual capacity of the condenser is higher or lower or equal to the capacity for which the rheostat 97 and the shunt resistance 99 have been adjusted.

It will first be assumed that the actual capacity of the condenser under test is higher than that for which the rheostat 97 and resistance 99 are adjusted. In this case when the condenser is discharged through the coil 84, the high-low relay will operate to close its contact 82. Thus when relay 15 operates and closes contact 17, a circuit is completed from ground, contact 17 of relay 15, contact 19 of relay 18, back contact 40 of relay 36, common conductor 81, contact 82, common conductor 80, contact 6 of relay 1, through the high capacity lamp 93, contact 63, to battery. A branch of this circuit extends through relay 53 to battery. The lighting of lamp 93 indicates to the operator that the capacity of the condenser under test is too high. Relay 53 operates in multiple with the high capacity lamp 93. At its contact 57 relay 53 opens the original energizing circuits for the start relay 1 and for relay 13. At contact 55 it closes a locking circuit for itself over the grounded conductor 105. The effect of the opening of contact 54 will be explained later. The release of relays 1 and 13 brings about the release of all the operated relays except relay 53 which is locked to conductor 105 and relays 74 and 18 which are held energized over conductor 108 and the three-plate contact.

A high capacity indication between the lower and the common center plates of the condenser either indicates that this section of the condenser has too high a capacity or that the common center plate and the upper plate are short-circuited. In the latter case the increased plate area, due to the upper and middle plates being short-circuited, would result in a high capacity indication between the lower and the middle plates. The short-circuit test to determine which of these conditions caused the high capacity indication will be explained later.

It will now be assumed that the capacity of the lower section of the condenser is too low. In this case, when the condenser is discharged through the coil 84 of the high-low relay, the coil will not be rotated a sufficient amount to lift the right hand pointer from the mercury cup 83. In this case when relay 15 operates, a circuit is closed from ground, contact 17, contact 19, back contact 40 of relay 36, common conductor 81, contact 83, common conductor 79, contact 7 of relay 1, the low capacity lamp 95, contact 65, to battery. A branch of this circuit extends through the winding of relay 48 to battery. Relay 48 operates and locks itself to the grounded conductor 105 at contact 50. The lighted condition of lamp 95 indicates to the operator that the capacity of the condenser is too low. A low capacity indication would also be obtained in case the lower and the common center plates of the condenser were short-circuited. Relay 48 in operating opens its contact 52 thereby opening the circuit of relays 1 and 13 and bringing about the release of all the operated relays except relay 48 and the three-plate relays 74 and 18. Relay 48 is held operated over conductor 105 until after the short-circuit test, as will be explained later.

For the present it will be assumed that the capacity betwen the lower and center plates of the condenser is within the allowable limits, that is, contacts 82 and 83 are both open when relay 15 operates, and that neither relay 48 nor relay 53 is operated at this time. When relay 15 operated, as explained above, it closed at contact 16 an obvious circuit for the slow-to-operate relay 36. Relay 36 operates and at contact 37 opens the circuit of relay 43 allowing it to release. At contact 38 it closes an obvious circuit for the relay 24, which at contact 25 closes a circuit for relay 26. The make contact of relay 24, however, is a weighted spring contact and it is some time before the circuit for relay 26 is maintained closed. Relay 36 at contact 40 opens the circuit over which ground was supplied to the common conductor 81. A circuit is now closed from battery, rheostat 97, common conductor 91, back contact 45 of relay 43, contact 41 of relay 36, conductor 110, contact 167, terminal 171 of the condenser, terminal 170 of the condenser, contact 166, conductor 109, contact 42 of relay 36, back contact 47 of relay 43, common conductor 92, contact 86 of the harmonic converter, resistance 87, to ground. The upper section of the condenser is charged in this circuit. When the harmonic converter operates in the opposite direction, common conductor 92 is transferred to the coil 84 of the high-low relay and allows the condenser to discharge through this coil. The operation of the high-low relay depends upon whether the upper section of the condenser is within the limits of capacity for which the rheostat 97 and the shunt 99 are adjusted. If the capacity is either too high or too low, the high-low relay operates to close either its contact 82 or its contact 83 as described above for the test of the lower section of the condenser. This results in the operation of relay 48 or 53 and the lighting of lamps 95 or 93 when relay 26 operates and at its front contact 29 connects ground through contact 17 to the common conductor 81. If either relay 48 or relay 53 is operated it will be locked up to the grounded conductor 105 in the same manner as previously described. The operation of either relay at this time will also open the original energizing circuit for relays 1 and 13 and bring about the release of the remainder of the relays as pointed out above.

The subsequent operation depends upon whether the capacity test of either section of the condenser resulted in a high capacity or a low capacity indication. It will first be assumed that the relay 48 is operated and the low capacity lamp 95 is lighted. As pointed out above, when relay 48 operated it opened its contact 52 thereby opening the original energizing circuit of relays 1 and 13. The release of these relays causes the release of relays 15, 36, 24, and 26. Relay 36 in releasing closes its back contact 39 thereby completing an energizing circuit for the slow-to-operate relay 58. This circuit extends from ground, back contact 39 of relay 36, back contact 98 of relay 43, front contact 51 of relay 48, winding of relay 58, to battery. Relay 58 operates and closes its contacts 59, 60, and 61. The closing of contact 61 connects the lower plate of the condenser to the upper plate of the condenser over conductor 111, front contact 61, front contact 77 of relay 74 and conductor 109. At contacts 59 and 60, the relay 67 is bridged across the common center plate and the two connected outside plates. This circuit extends from ground through the upper winding of relay 67, contact 60, back contact 73 of relay 67, conductor 111 to the lower plate of the condenser and from battery, lower winding of relay 67, contact 59, back contact 71 of relay 67, front contact 75 of relay 74, and thence over conductor 110 to the common center plate of the condenser.

If the lower and the common center plates of the condenser are short-circuited due to a defect, a direct current circuit is closed for relay 67 which operates in this circuit. Relay 67 closes a locking circuit for itself at contact 69 and at contact 68 closes an obvious circuit for relay 62. Relay 62 operates and opens its contacts 63 and 65 and closes contacts 64 and 66 thereby removing battery from the high and low capacity lamps 93 and 95, respectively, and connecting battery to the No. 2 and No. 1 short lamps 94 and 96, respectively. A circuit is now completed from the grounded conductor 105 front contact 50 of relay 48, No. 1 short lamp 96, front contact 66 of relay 62, to battery. Lamp 96 is lighted in this circuit and it informs the operator that the low capacity indication previously recorded was due to a short circuit between the lower and center plates of the condenser. Lamp 96 remains lighted and the relays 48, 58, 62, and 67 remain locked to the grounded conductor 105 and relays 74 and 18 remain energized over conductor 108 until the defective condenser is removed from its position.

As pointed out above, a short circuit between the common center plate of the condenser and the upper plate of the condenser will result in a high capacity indication when the capacity test between the lower plate and the common center plate is made. In this case the relay 53 will be operated and the high capacity lamp 93 will be lighted. When relay 53 operated it opened its contact 57 thereby bringing about the release of relays 1 and 13 which in turn initiate the release of the remaining operated relays as explained above. Relay 53 also closes contact 56 thereby preparing the circuit for relay 58. As soon as relay 36 releases a circuit is closed from ground, back contact 39 of relay 36, back contact 98 of relay 43, front contact 56 of relay 53, winding of relay 58, to battery. Relay 58 closes its contacts 59, 60, and 61 with the same results as explained above in connection with the short-circuit test following the low capacity indication. In this case, when relay 62 operates and transfers the battery connections from the high and low capacity lamps 93 and 95, respectively, to the No. 2 and No. 1 circuit lamps 94 and 96, respectively, the lamp 94 is lighted in a circuit extending from battery, contact 64 of relay 62, lamp 94, front contact 55 of relay 53, to the grounded conductor 105. The lighting of lamp 94 informs the operator that the high capacity indication previously received was due to a short circuit between the common center plate and the upper plate of the condenser. The lamp 94 remains lighted and relay 53 and the other relays which are operated at this time remain locked to the grounded conductor 105 until the defective condenser is removed from its position.

In case the lighting of lamp 93 or 95 was not due to a short circuit but was due to either section of the condenser having a capacity outside of the allowable limits, the relay 58 operates as previously explained due to the closing of contact 51 or 56, and bridges the relay 67 across the common center plate and the two outside plates of the condenser. If neither section of the condenser is short circuited, there will be no direct current circuit for relay 67 and the relay will not operate. Consequently no circuit will be closed for relay 62 and the lamp 93 or the lamp 95, depending on whether a high or a low capacity indication was received, remains lighted and the relay 53 or 48 remains locked to the ground conductor 105. If the lighting of either of the lamps 93 or 95 is not followed by the lighting of one of the short lamps 94 or 96, the operator knows that the condenser is not short-circuited but that the capacity of either section is not within the allowable limits. The lighted lamp is extinguished and the relay, 48 or 53, and the relays 74 and 18 are released as soon as the defective condenser is removed from the set.

In order to explain the remaining tests which are performed by the set, it will be assumed that the capacity of the two sections of the condenser are within the required limits and that the condenser is not short-circuited. When relay 26 operated during the capacity test of the upper section of the condenser as explained above, it completed an obvious energizing circuit for relay 112 at its contact 28. Relay 112 is made slow-to-operate so that its contact 113 will not be closed before either relay 48 or 53 has had time to operate in case the capacity test shows a high or a low condenser. Relay 112 in operating closes a locking circuit for itself at front contact 114 to the grounded start circuit and at back contact 115 it opens the start lead to relays 1 and 13. These relays release and bring about the release of relays 15, 36, 24, and 26. The release of relay 1 also closes contacts 4 and 5 thereby completing the battery circuit for the start relays of positions 2 and 3 and allowing the succeeding position to start its capacity test. Relay 112 also opens its contact 116 thereby opening the circuit over which the 500 volt AC break-down potential is supplied to the condenser. At its front contact 113, relay 112 closes the following circuit for relay 130 and relay 117: ground supplied from the start contact over conductor 105, back contacts 49 and 54, conductor 104, front contact 113 of relay 112, conductor 103, back contact 27, conductor 102, winding of relay 117, to battery and through the back contact 27, front contact 23 of relay 18, conductor 100, back contact 120 of relay 119, back contact 138 of relay 137, winding of relay 130, to battery. Relays 117 and 130 are energized in multiple in the above-traced circuit.

The make contact 118 of relay 117 is a weighted spring contact and it is some time before the spring comes to rest and maintains contact 118 closed a sufficient length of time to operate the slow-to-operate relay 119. In the meantime, relay 130 energizes and opens its contact 131 to prevent the operation of relay 126 if relay 119 should operate prematurely. Relay 130 also closes its contacts 132, 133, and 134 thereby initiating the break-down test between the plates of the condenser. This break-down test consists of placing a high direct current potential across the plates of the condenser to test the strength of the dielectric between the plates. The voltage used in a break-down test may vary from 500 volts to 1000 volts depending upon the type of condenser being tested. The closing of the contacts of relay 130 completes a circuit from one side of the direct-current source, conductor 180, winding of relay 156, through contacts 133 and 134 in multiple, conductors 109 and 111 in multiple, contacts 166 and 168 and terminals 170 and 172 to the upper and lower plates of the condenser in multiple. A circuit is also completed from the other side of the direct-current source, conductor 179, contact 132 of relay 130, conductor 110, contact 167, terminal 171, to the common center plate of the condenser.

If the dielectric between the upper plate and the common center plate, and between the lower plate and the common center plate is of proper strength, no current will flow in the above circuit. However, if there is a defect in the dielectric of either section of the condenser, the dielectric will be broken down by the high direct-current voltage and current will flow over the above-traced circuit through the winding of relay 156. Relay 156 energizes in this circuit and closes its contact 157 which is a weighted spring contact and requires some time to come to rest and maintain the circuit for relay 158 closed a sufficient length of time to allow relay 158 to operate. This weighted spring arrangement is provided so that relay 156 will not completely operate and bring about the operation of relay 158 due to the charging current of the condenser which passes through relay 156. Relay 158 in operating closes a locking circuit for itself at contact 160 and at contact 159 closes a circuit for the break-down lamp 174. At contact 161 the relay opens the start circuit thereby bringing about the release of all the relays except relay 158 and relays 74 and 18 which are locked up over the three-plate contact. The lighting of lamp 174 informs the operator that the condenser has failed to pass the break-down test. The lamp remains lighted and relay 158 remains locked up until the defective condenser is removed from its position in the set.

It will now be assumed that the high direct current voltage fails to break down the dielectric between the center plate and the two outer plates of the condenser. When relay 117 has been operated a sufficient length of time to maintain its contact 118 closed, the relay 119 operates in an obvious circuit and at contact 120 opens the energizing circuit of relay 130 which accordingly releases. At contact 121 relay 119 prepares the circuit for relay 126 which is completed by the release of relay 130 at contact 131. Relay 126 operates and at contact 127 opens the circuit of relay 122 to prevent the premature operation of this relay. At contacts 128 and 129 relay 126 connects the direct-current break-down potential to the two outer plates of the condenser. If the dielectric between the two outer plates is of sufficient strength to withstand the high direct-current voltage, relay 156 will not be energized a sufficient length of time to operate relay 158. However, if the dielectric between the two outer plates is broken down due to this voltage, the relay 156 will operate and in turn operate relay 158 with the results described above.

It will be assumed that the condenser has successfully passed the two break-down tests explained above. When relay 119 operated and closed its contact 121, an energizing circuit was completed for relay 135 in parallel with relay 126. Relay 135 operates and closes its contact 136 which is also a weighted spring contact and requires some time before it comes to rest. When the weighted spring contact of relay 135 finally comes to rest, relay 137 operates in an obvious circuit and closes a locking circuit for itself at contact 141. At its back contact 142 the relay opens the locking circuit of relay 112 which accordingly releases and opens its contact 113. The opening of contact 113 brings about the release of relays 117, 119, 126, and 135. Relay 112 in closing its contact 116 again prepares the circuit for one side of the 500 volt alternating current source. At contact 140, relay 137 prepares a circuit for relay 122 which is completed at contact 127 when relay 126 releases. Relay 122 operates and at its contacts 123, 124, and 125 connects the three plates of the condenser together to allow the two sections of the condenser to discharge. At its contact 138, relay 137 opens a further point in the circuit of relay 130 to prevent the possibility of any false operation of this relay and the connection of the break-down potential to the plates of the condenser while they are short-circuited at contacts 123, 124, and 125. At its contact 139, relay 137 completes an obvious circuit for relays 143 and 146 in multiple.

Relay 143 operates from ground on contact 139 and closes its contacts 144 and 145. The closing of these contacts completes a circuit from one side of the 500 volt alternating current source, conductor 177, contact 145, back contact 116 of relay 112, contacts 123, 124, and 125 in multiple, to the three plates of the condenser over conductors 109, 110, and 111. The other side of the alternating current source is connected over conductor 178, contact 144, winding of relay 151, to the pointed contact 169 which has penetrated the covering of the condenser and is in electrical contact with the can of the condenser. If the insulation between the plates of the condenser and the can of the condenser breaks down under this alternating current voltage, current will flow through the winding of relay 151 and allow this relay to operate. Relay 151 in operating closes an obvious circuit for relay 153 and for the lamp 175 at contact 152. Relay 153 operates and at contact 154 closes a locking circuit for itself to the start contact over back contact 161 of relay 158. At contact 155, relay 153 opens the start lead thereby bringing about the release of relays 137 and 122. The lighting of lamp 175 informs the operator that the insulation test of the condenser has failed. Relay 153 remains operated and lamp 175 remains lighted until the refective condenser is removed from its position in the set.

It will now be assumed that the insulation between the plates and the can of the condenser is of sufficient strength to withstand the high potential alternating current. In this case no current will flow through relay 151 and the relay will not operate. When relay 137 operated and closed its contact 139 it completed an energizing circuit for relay 146 in parallel with relay 143. Relay 146 energizes and after a short time its weighted spring contact comes to rest and closes contact 147 thereby closing an obvious energizing circuit for relay 148 and the lamp 176 in parallel. Relay 148 operates in this circuit and closes its contact 149 thereby locking itself energized to the start contact over contacts 155 and 161. At contact 150, relay 148 opens the locking circuit of relay 137 allowing this relay to release and bring about the release of relays 143, 146, and 122. The lighting of lamp 176 informs the operator that the condenser under test has successfully passed the various tests and is ready for use. Relay 148 remains operated and the lamp 176 remains lighted until the condenser, which has satisfactorily passed all the tests, is removed from its position. When the condenser is removed, the spring contacts 166, 167, and 168 are returned to normal and the start contact 162 and the three-plate contact 163 are opened, thereby bringing about the release of relay 148 and the extinguishing of the O. K. lamp 176 and also the release of the three-plate relays 74 and 18.

Having described in detail the testing of a three-plate condenser, the operation of the test set when used for testing two-plate condensers will now be described. When a two-plate condenser is inserted in position in the test set, the spring contacts 166 and 168 will be moved to the left by the outside terminals of the condenser as previously explained for the three-plate condenser. On a two-plate condenser there is no terminal corresponding to the terminal 171 and consequently the spring contact 167 will not be operated and the three-plate contact 163 will not be closed. The sharp-pointed contact 169 makes electrical contact with the can of the condenser in the same manner as previously described. It will be assumed that neither position 2 nor position 3 is testing at the time the condenser is inserted in position 1. When the start contact 162 is closed, energizing circuits for relays 1 and 13 are completed and these relays energize in parallel as previously explained. Relay 1 closes its contact 10 and in this case, since the three-plate relay 18 is not energized, completes a circuit for the relay 30, instead of relay 43. Relay 30 operates and closes its contacts 34 and 35 thereby connecting the two plates of the condenser to the common conductors 91 and 92, respectively. The capacity test is then made in the same manner as previously explained for a three-plate condenser. However, in this case only one test is necessary. When relay 30 operated, it closed, at contact 31, a circuit for relay 24. Relay 24 operates and at contact 25 closes its weight spring contact to operate relay 26. Relay 26 operates after a time, and at contact 28 closes a circuit over conductor 106 for the slow-to-operate relay 112. If the condenser under test is of too high or too low capacity, or if shorted, one of the relays 48 or 53 will be operated and locked to the start circuit over conductor 105. The ground for operating these relays and lighting the corresponding high or low lamps is supplied from contacts 33 of relay 30, contact 29 of relay 26, to the common conductor 81. If the capacity of the condenser is within the required limits and the conductor is not shorted, neither relay 48 nor relay 53 will be operated and no circuit will be closed for relay 58. In this case, the short-circuit test is dispensed with. However, if either relay 48 or 53 is operated, the relay 58 energizes in the same manner as previously pointed out in the three-plate test, and at the contacts 59 and 60 it bridges the relay 67 across the two plates of the condenser. The circuits extend from ground, upper winding of relay 67, front contact 60, back contact 73, over conductor 111 to the lower plate of the condenser and from battery, lower winding of relay 67, front contact 59, back contact 71, back contact 76, over conductor 109 to the upper plate of the condenser. The relay 74 is not operated when testing two-plate condensers. If the plates of the condensers are short-circuited, relay 67 operates with the same results as previously described.

Assuming that the condenser is not short-circuited and that the capacity is within the required limits, relay 26 remains operated and maintains the circuit of relay 112 closed a sufficient length of time to operate this relay. At contact 114, relay 112 locks itself to the start circuit as previously explained. At contact 115 it opens the circuit of relays 1 and 13 allowing these relays to release and causing the release of relays 15, 24, 26, 30, and 36. Relay 112 in closing its contact 113 completes a circuit for relay 119 extending from grounded conductor 105, back contacts 49 and 54, conductor 104, contact 113, conductor 103, back contact 27 of relay 26, back contact 22 of relay 18 which is not operated at this time, conductor 101, winding of relay 119 to battery. Relay 119 operates in this circuit and at contact 121 closes a circuit for relay 135 and a branch extending over contact 131 to relay 126. Relay 126 operates and at contact 127 opens the circuit of relay 122 to prevent the premature operation of this relay. At contacts 128 and 129 it connects the direct current break-down potential to the two plates of the condenser. If the dielectric between the plates is broken down by this potential, relay 156 operates with the results previously described.

It will be assumed that the dielectric between the condenser plates is of sufficient strength to withstand the break-down potential and that relay 156 does not operate. Relay 135 which energized in multiple with 126 closes its contact 136, which, after the weighted spring has come to rest, completes an operating circuit for relay 137. Relay 137 operates and locks itself operated to the start circuit over contact 141 and at contact 142 opens the locking circuit of relay 112 which releases and brings about the release of relay 119. Relay 119 in releasing opens the circuit of relays 126 and 135 which also release. The release of relay 126 completes the circuit of relay 122 at contact 127. Relay 122 operates and at contacts 123 and 125 short-circuits the condenser and allows it to discharge. Relay 137 in operating also closes contact 139 completing obvious circuits for relays 143 and 146 in parallel. The operation of the test set for the insulation break-down test and for the final O. K. indication is the same as previously explained for a three-plate condenser and need not be repeated.

Although only three positions are indicated in the drawings, it is evident that this number can be increased if desired. It is only necessary to add a pair of break springs to each of the start relays such as 1, 2, and 3 for each additional position. In order to insure that the different positions will test in proper sequence, the springs of the start relays are adjusted so that the pair of springs which furnishes battery to the succeeding position will be the first to close its contact when the relay releases. Thus the springs of relay 1 are adjusted so that the contact 4 is the first to close when the relay releases. This allows the start relay 2 of position 2 to operate and open its contact 8 thereby preventing the operation of relay 3. Similarly when relay 2 releases, contact 8 is the first to close thereby allowing the start relay 3 of position 3 to operate and open its contact 11 to prevent the operation of relay 1. This insures that the various positions will test in proper sequence as long as the operator keeps the positions supplied with condensers to be tested.

Although only a particular embodiment of the invention has been illustrated, namely the testing of two and three-plate telephone condensers, it will be evident to those skilled in the art that the invention with slight modifications can be adapted for testing all types of electrical condensers without departing from the spirit of the invention.

Having described the invention, what is thought to be new and is desired to have protected by Letters Patent will be pointed out in the appended claims.

What is claimed is:

1. In a test set, a plurality of test devices, means responsive to the insertion of an apparatus to be tested in any device for initiating the test by that device provided no other device is testing at the time, and means for causing said devices to test in a definite order, each device initiating its test as soon as the test by the preceding device has progressed to a predetermined point.

2. In a test set, a plurality of test devices, means responsive to the insertion of an apparatus to be tested in any device for initiating the test by that device provided no other device is testing at the time, and means for automatically initiating the test by the succeeding device as soon as the test by the first device has progressed to a particular point.

3. In a condenser test set, a condenser, means for testing the capacity of said condenser, means for testing said condenser for short circuits, means for testing the dielectric and insulation strength of said condenser, and means operative if said condenser fails to successfully pass one of said tests for indicating the defect and for preventing the performance of the remainder of the tests.

4. In a condenser test set, a plurality of test positions, a start relay at each of said positions, means responsive to the insertion of a condenser to be tested in one of said positions for operating the associated start relay, and means responsive to said operation for preventing the operation of any other start relay.

5. In a condenser test set, a plurality of test positions, a start relay at each of said positions, means responsive to the insertion of a condenser in one of said positions for operating the associated start relay, and means controlled by each of the other start relays for rendering said first means ineffective.

6. In a condenser test set, a plurality of test positions, a relay group individual to each position for performing a series of tests, apparatus common to said positions, means for associating said common apparatus with any of said positions when testing is initiated at that position, and means effective when the tests requiring the common apparatus have been completed for releasing said apparatus and allowing the succeeding position to connect with said apparatus and perform such tests while the first position is making the remainder of its tests.

7. In a test set, a plurality of test positions, means at each position for performing a series of tests when an apparatus to be tested is inserted at that position, means for stopping the tests at a point when a defective piece of apparatus is found, and means responsive to said stopping means for initiating the tests at the succeeding position.

8. In a test set, a plurality of test devices, means in each device for performing a series of tests when an apparatus to be tested is inserted in the device, means for stopping the tests at a point when a defective piece of apparatus is found, a plurality of signals, and means for operating a particular one of said signals to indicate the defect in said apparatus.

9. In a test set, a plurality of test positions, means at each position for performing a series of tests when an apparatus to be tested is inserted in that position, a plurality of signals at each position, means for stopping the tests at a point when a defective piece of apparatus is found and for operating one of said signals to indicate the defect, and means responsive to said last means for initiating the tests at the next succeeding position at which an apparatus to be tested has been inserted.

10. In a condenser test set, a relay group for performing a series of tests on a condenser, means for automatically initiating said tests as soon as a condenser is inserted in position, means for stopping the tests at a point when the condenser proves defective, and means for indicating in what respect the condenser has failed.

11. In a condenser test set, a relay group for performing a series of tests, means for automatically initiating said tests as soon as a condenser is inserted in position, a plurality of signals associated with said relay group, and means effective if said condenser fails to successfully pass one of said tests for preventing the performance of the remainder of the tests and for operating one of said signals to indicate in what respect the condenser has failed.

12. In a condenser test set, a relay group for performing a series of tests, means for initiating said tests responsive to the insertion of a condenser in position to be tested, a plurality of signals, means for stopping said tests in case said condenser is found defective and for operating a particular one of said signals to indicate the defect, and means for maintaining said signal operated until the defective condenser is removed from its position.

13. In a condenser test set, a plurality of test positions, a relay group at each position for performing a series of tests, means responsive to the insertion of a condenser at one of said positions for initiating the tests at that position, means for stopping the tests at a point in case the condenser proves defective and for indicating the defect, and means responsive to said last means for initiating the tests at the next succeeding position at which a condenser is in position for testing.

14. In a condenser test set, two combinations of testing circuits each for testing a particular type of condenser, and means controlled by a condenser in position to be tested for selecting the particular combination of circuits which is adapted to test that type of condenser.

15. In a condenser test set, a plurality of testing circuits for testing two types of condensers, means for initiating the tests responsive to the positioning of a condenser in said set, and two relays for selecting either of two combinations of said testing circuits, the operation of said relays being dependent on and controlled by the type of condenser which is positioned in the set.

16. In a condenser test set arranged to test both two-plate and three-plate condensers, two relays, means for operating said relays only when a three-plate condenser is positioned in said set, and means controlled by said relays for preparing said set to test a three-plate condenser.

17. In a condenser test set, a relay group for performing a series of tests, means for initiating said tests responsive to the insertion of a condenser in position for testing, and discriminating means in said relay group controlled by said condenser for arranging the circuits of said relay group to test both two and three-plate condensers.

18. In a condenser test set, a relay group for performing a series of tests, circuit arrangements in said relay group for testing either two-plate or three-plate condensers, means for initiating said tests responsive to the positioning of a condenser in said set, and discriminating means in said relay group controlled by said condenser for arranging the circuits to test the particular type of condenser which has been positioned in the set.

19. In combination, a plurality of testing devices, means in each device for performing a series of tests upon apparatus inserted therein, and means for causing said devices to test in a predetermined consecutive order.

20. In a condenser test set, means for testing the capacity of a condenser inserted therein, a plurality of signals, means for selectively operating said signals to indicate defects in said condenser in case it fails to successfully pass said capacity test, and means operative only in case one of said signals is operated for testing said condenser for short-circuits.

21. In a condenser test set, means responsive to the insertion of a condenser in said set for completing a charging circuit for said condenser, means for automatically opening said charging circuit and for completing a discharging circuit for said condenser, a plurality of signals, and means in said discharging circuit for selectively operating said signals to indicate a low or a high capacity in case the capacity of said condenser is not within predetermined limits.

22. In a condenser test set, a plurality of signals, a coil, means responsive to the insertion of a condenser in said set for completing a charging circuit for said condenser, means operated a predetermined interval thereafter for opening said charging circuit and for completing a discharging circuit through said coil, and means controlled by said coil and dependent upon the value of the discharge current for selectively operating said signals in case the capacity of said condenser is not within predetermined limits.

In witness whereof, I hereunto subscribe my name this 26th day of December, A. D. 1929.

HAROLD C. ROBINSON.